Sept. 21, 1926.                                              1,600,267
                          T. F. ATOR
                      DIRIGIBLE HEADLIGHT
              Filed March 19, 1926        2 Sheets-Sheet 1
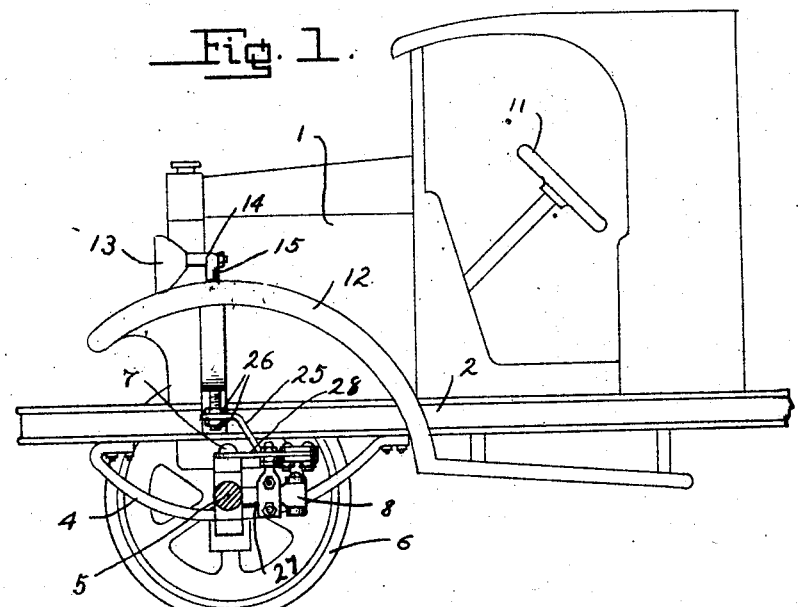
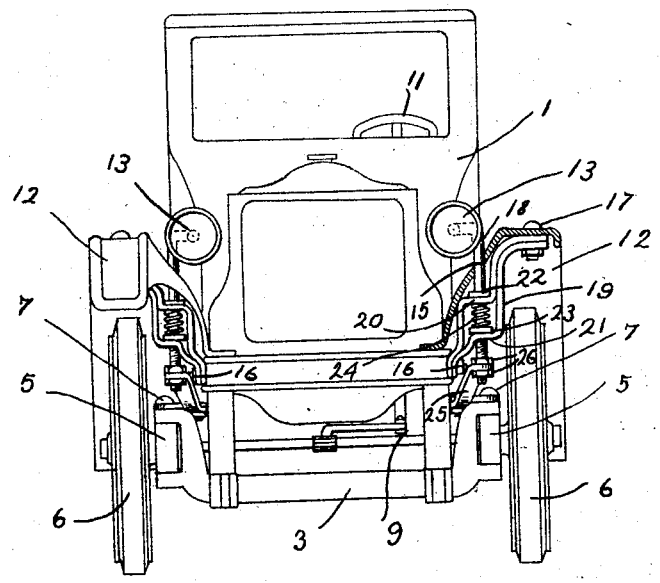
Inventor
T. F. ATOR
By
Lacey & Lacey, Attorneys Sept. 21, 1926. 1,600,267
T. F. ATOR
DIRIGIBLE HEADLIGHT
Filed March 19, 1926 2 Sheets-Sheet 2
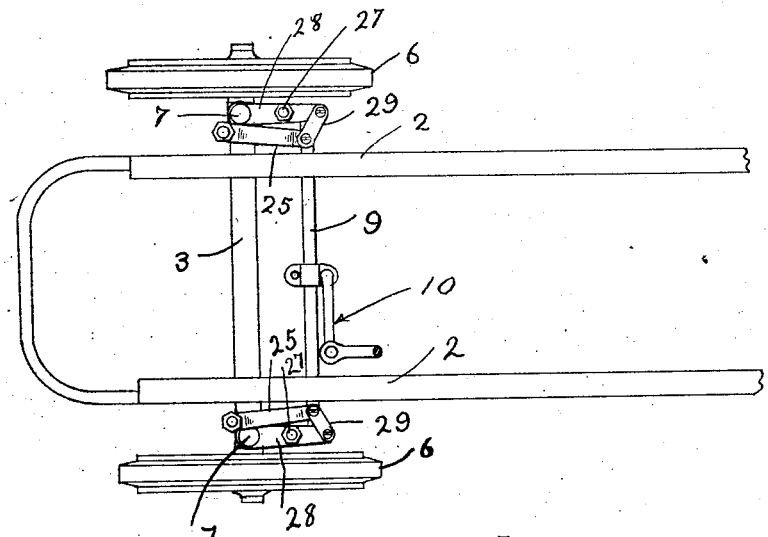
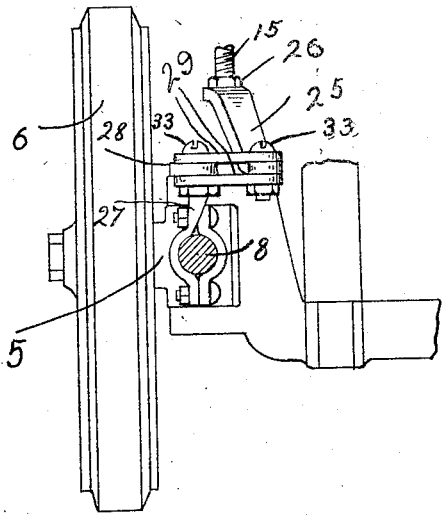
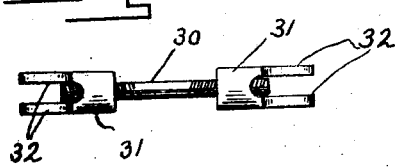

Patented Sept. 21, 1926.

1,600,267

UNITED STATES PATENT OFFICE.

THOMAS F. ATOR, OF PLENTYWOOD, MONTANA.

DIRIGIBLE HEADLIGHT.

Application filed March 19, 1926. Serial No. 95,973.

This invention relates to headlights for use upon automobiles and other vehicles, and one object of the invention is to provide the vehicle with headlights which will turn when the front wheels are turned.

Another object of the invention is to prevent the dirigible headlights and their control mechanism from being damaged by vibration as the automobile passes over uneven surfaces in a road.

Another object of the invention is to so mount the bearing brackets of the headlights that they will serve not only as bearing brackets for the headlights but also as braces for the front mud guards.

Another object of the invention is to so construct the dirigible headlights and their control mechanism that they may be applied to an automobile having a conventional steering mechanism.

This invention is illustrated in the accompanying drawings, wherein—

Figure 1 is a view principally in side elevation and partially in section and showing the improved dirigible headlights applied to an automobile of a conventional construction;

Fig. 2 is a view showing the automobile in front elevation with the dirigible headlights applied thereto, one of the mud guards being shown in section;

Fig. 3 is a top plan view of the chassis with the mechanism for imparting turning movement to the headlights connected therewith;

Fig. 4 is an enlarged fragmentary view of the headlight turning mechanism together with an automobile wheel and its mounting spindle, and Fig. 5 is a view illustrating a modified form of link which may be used in connection with the headlight turning device.

The automobile which is indicated in general by the numeral 1 is of a conventional construction and includes a chassis having side bars or chassis bars 2. The front axle 3 is suspended beneath the chassis bars 2 by the usual springs 4 and carries spindles 5 upon which the front wheels 6 are rotatably mounted. These spindles 5 are pivotally connected with the axle by the usual pivot pins 7 and each is provided with a rearwardly extending turning arm 8, the rear end of which is pivotally connected with a cross bar 9 to which the steering mechanism, indicated in general by the numeral 10, is secured. This steering mechanism is of a conventional construction and controlled by the usual steering wheel 11. The mud guards 12 for the front wheels are also of a conventional formation and are secured to the chassis bars and extend over the front wheels.

The headlights 13 and their control mechanism are of a duplicate formation and each includes a bracket 14 provided with a depending standard 15 of sufficient length to extend downwardly through the mud guard above which the headlight is located with its lower end terminating adjacent the chassis bar at the side of the automobile. A bearing bracket is provided for each standard 15 and has its lower end secured to the adjacent chassis bar by a bolt or other suitable fastener 16 and its upper end secured against the under face of the mud guard by a bolt 17. The bearing brackets are rigid and, therefore, they will serve to brace the mud guards as well as serving to rotatably mount the standards of the lamp brackets. In the present illustration each bearing bracket is formed of metal strips 18 and 19 which are secured at their ends by the bolts 16 and 17 and have their intermediate portions bent to form vertically spaced leaves 20 and 21 having openings formed therein to receive the lamp bracket standard. Abutment nuts 22 and 23 are threaded upon the standards, one being located above the upper leaf 20 and the other between the leaves 20 and 21, as shown in Fig. 2. The nuts 22 and 23 serve to prevent the standard from moving downwardly through its mounting brackets beyond a desired extent and in addition the nut 23 constitutes an abutment for engaging one end of a spring 24 which fits about the standard between the nut 23 and the under face of the leaf 20. Therefore, the spring may serve to yieldably resist upward movement of the standard through the leaf 20 and the opening in the mud guard through which it passes.

In order to transmit rotary movement to the standards of the lamp brackets, each standard carries a lever arm 25 which is rigidly secured upon its lower portion by clamping nuts 26 and is bent, as shown in Fig. 1, so that its rear end portion is disposed in a lower plane than its forward end portion. A post 27 is secured to each of the rearwardly extending turning arms of the wheel spindles and these posts extend upwardly from the turning arms, as shown in Figs. 1 and 4. The upper ends of the posts are threaded and each is passed through an intermediate portion of a lever 28 and is secured by suitable clamp nuts. The levers 28 have their forward ends pivotally engaged with the pins 7 which connect the wheel spindles with the axle and have their rear end portions pivotally connected with links 29 which extend inwardly from the levers and are pivotally connected with the rear ends of the lever arms 25. Therefore, when the steering wheel is turned and the steering rod or cross bar 9 is moved to impart swinging movement to the turning arms and turn the front wheels of the automobile, the levers 28 will be swung with the turning arms and through the medium of the links 29 and lever arms 25 will impart rotary movement to the standards of the lamp brackets. The lamp brackets will, therefore, be rotated in the direction in which the front wheels are turned and the lamps swung in the direction in which the automobile is to be guided. Therefore, the light from the lamps or headlights will always be directed in front of the automobile and the driver may operate the automobile without danger of an accident due to faulty lighting of the road. If desired, the links 29 may be omitted and adjustable connectors, such as shown in Fig. 5, substituted therefor. These connectors are in the form of turnbuckles and each includes a rod 30 having oppositely threaded end portions and yokes 31 screwed upon the ends of the rod and having spaced arms adapted to straddle the lever 28 and lever arm 25 and receive the bolts 33 which connect the links 29 with the lever and lever arm.

Having thus described the invention, I claim:

1. In combination with a vehicle including a chassis bar, an axle yieldably supported below said chassis bar, a wheel spindle pivoted to said axle and having a turning arm, and a mud guard extending outwardly above said wheel spindle, a bracket secured to said chassis bar and mud guard and including vertically spaced upper and lower portions, a lamp bracket including a standard slidable vertically through the mud guard and vertically spaced portions of said bearing bracket and rotatable, an abutment carried by said standard between the vertically spaced portions of said bearing bracket, a spring between the abutment and upper portion of said bracket and yieldably resisting upward sliding of said standard, and means for transmitting rotary movement to said standard from said turning arm.

2. In combination with a vehicle including a chassis bar, an axle yieldably supported below said chassis bar, a wheel spindle pivoted to said axle and having a rearwardly extending turning arm, and a mud guard extending outwardly above said spindle, a bracket secured to said chassis bar and mud guard and including vertically spaced upper and lower portions, a lamp bracket including a standard slidable vertically through the mud guard and vertically spaced portions of said bearing bracket and rotatable, an abutment carried by said standard between the vertically spaced portions of said bearing bracket, a spring between the abutment and upper portion of the bearing bracket and yieldably resisting upward sliding of said standard, a lever arm rigidly secured to the lower end of said standard and projecting rearwardly therefrom, a post carried by said turning arm, a lever secured to said post and extending rearwardly therefrom, and a link connecting said lever with said lever arm.

In testimony whereof I affix my signature.

THOMAS F. ATOR. [L. S.]